Nov. 20, 1934.  A. DINA  1,981,033
APERTURE PLATE FOR MOTION PICTURE PROJECTION MACHINES
Filed Sept. 12, 1928  3 Sheets-Sheet 1
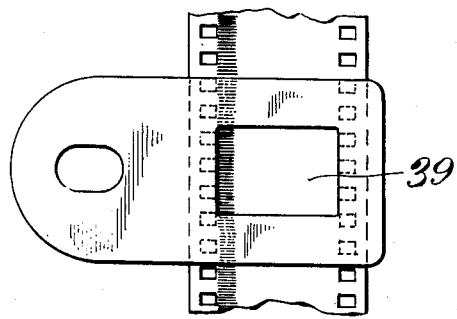
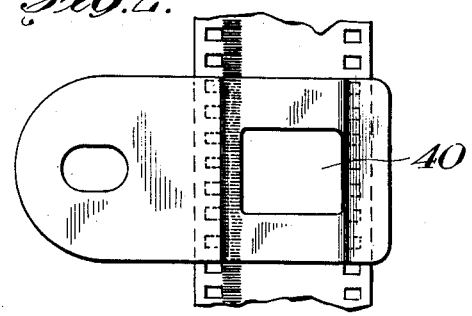
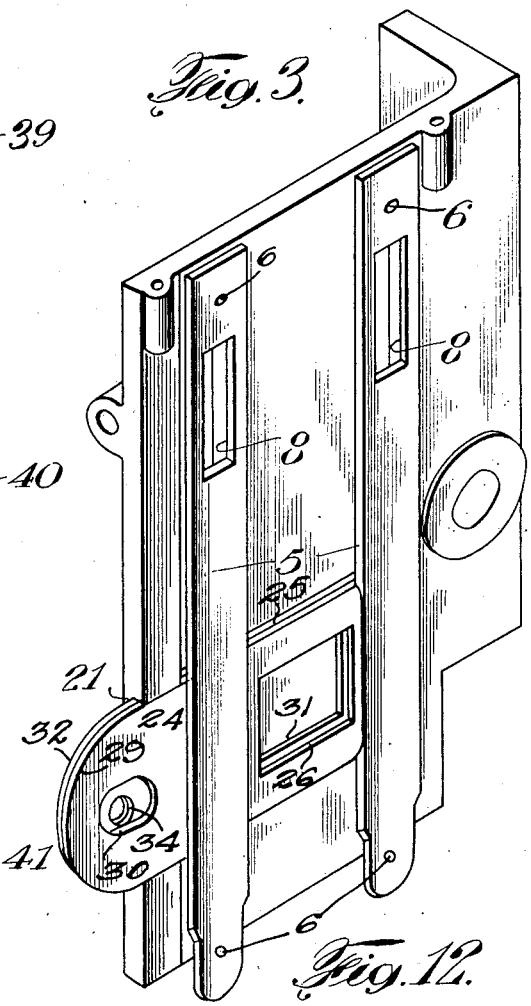
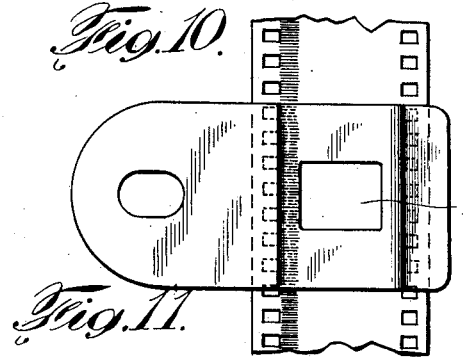
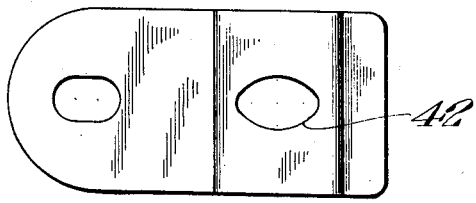
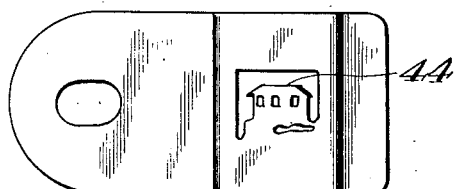
Inventor
Augusto Dina
By his Attorney
Howard W. Dix Nov. 20, 1934.　　　　　A. DINA　　　　　1,981,033
APERTURE PLATE FOR MOTION PICTURE PROJECTION MACHINES
Filed Sept. 12, 1928　　　3 Sheets-Sheet 2

Inventor
Augusto Dina
By his Attorney
Howard W. Dix

Nov. 20, 1934.  A. DINA  1,981,033
APERTURE PLATE FOR MOTION PICTURE PROJECTION MACHINES
Filed Sept. 12, 1928    3 Sheets-Sheet 3
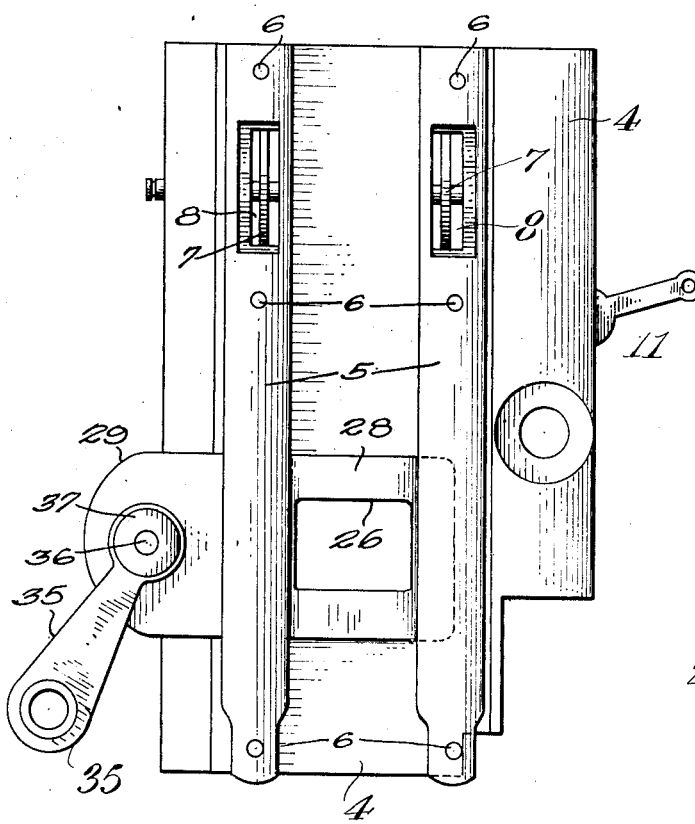
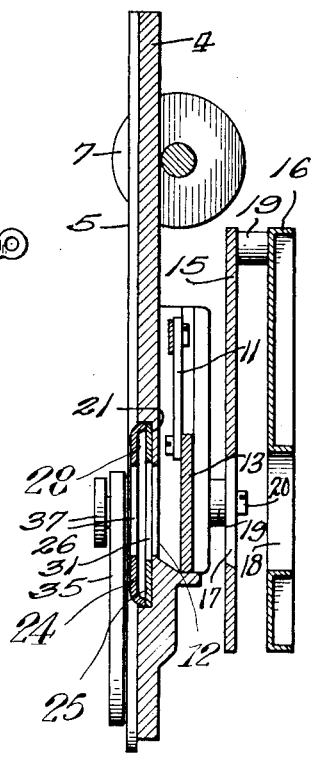
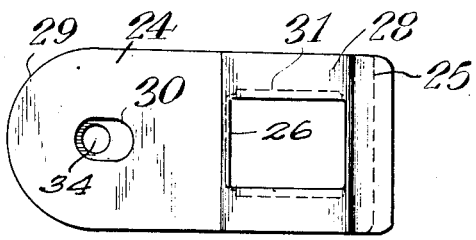
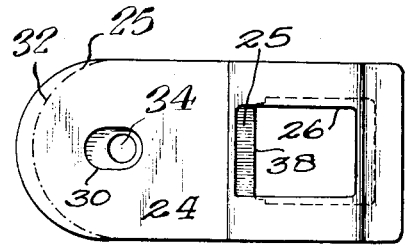
Inventor
Augusto Dina
By his Attorney
Howard W. Dix Patented Nov. 20, 1934

1,981,033

UNITED STATES PATENT OFFICE 1,981,033

APERTURE PLATE FOR MOTION PICTURE PROJECTION MACHINES

Augusto Dina, Jersey City, N. J., assignor to International Projector Corporation, New York, N. Y., a corporation of Delaware Application September 12, 1928, Serial No. 305,386

7 Claims. (Cl. 88—17)

The present invention relates to moving picture machines and more particularly to aperture plates therefor.

In talking or sound pictures, the sound is usually reproduced directly from the film somewhat similarly to the projection of pictures, the amount of light passing through a portion of the film determining the character of the sound. It is customary at the present time to record the sound on a section of the film adjacent the sprocket holes on one side thereof. This portion of the film is usually called the movietone or sound section track or strip. Where both sound and pictures are recorded on the same film, between the sprocket holes, the width of the film possible for pictures is decreased. With smaller size pictures, smaller apertures in the aperture plates are desirable. This occasions difficulty particularly because movietone or sound pictures and the regular standard size pictures are frequently thrown on the screen consecutively. That is, one reel of film may be of standard size or width and the next reel may be sound picture film which has the width between the series of sprocket holes taken up by the sound strip and by the exposures. It is therefore desirable to be able to project both types of films with the same projector.

The present invention contemplates an improved aperture plate which will minimize the time required to change the size of the aperture in the aperture plate to accord with the size of the picture on the film and to shield the sound section, if any. Such a construction eliminates the difficulties encountered where films are shown with the same projector with and without accompanying sound. For example, it may be desirable to show news reels without sound along with sound pictures in the same machine. The varied program of the present moving picture theatre requires a machine quickly adjustable for either type of film. This invention is obviously also applicable to cameras, printing machines and other light transmitting machines having apertures to be thus changed for the same or similar purposes.

An object of the present invention is to simplify the consecutive showing of moving pictures with and without acompanying sound by providing a machine which can be readily adjusted to project films having pictures thereon differing from the standard size.

Another object of the present invention is to provide an inexpensive aperture plate that may be removed from its associated mechanism in minimum time to permit the same machine to be used for projecting pictures with and without accompanying sound.

Another object of the invention is to provide a readily removable aperture plate which is held rigidly in position by portions depressed from the plane of the plate so that it cannot get out of adjustment.

Another object of the invention is to provide an aperture plate having a plurality of parts, one of which may be adjusted to change the size of the aperture in another.

A further object of the invention is to provide an aperture plate which is held in position by a second plate adapted to slide back of the aperture plate, and to control the size of the aperture in the aperture plate by adjusting the position of the second plate.

Other and further objects of the invention will be obvious upon an understanding of the illustrated embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, wherein Fig. 1 is a plan view of an aperture plate with a standard size aperture applied to a movietone film, illustrating the impracticability of its use therewith;

Fig. 2 is a plan view of a plate having an aperture of suitable dimensions for use with movietone or sound films;

Fig. 3 is a perspective view of a portion of a projecting machine with an aperture plate in accordance with the present invention;

Fig. 5 is a front view of the mechanism shown in Fig. 3 illustrating the parts with which the film contacts;

Fig. 6 is a vertical sectional view of the improved aperture plate and associated mechanism;

Fig. 8 is a detailed plan view of an aperture plate with the parts thereof in position for a standard picture;

Fig. 9 is a plan view of the plate shown in Fig. 8 adjusted for pictures on a sound film; and Figs. 10, 11 and 12 illustrate plates with different forms of apertures therein.

Figure 4:
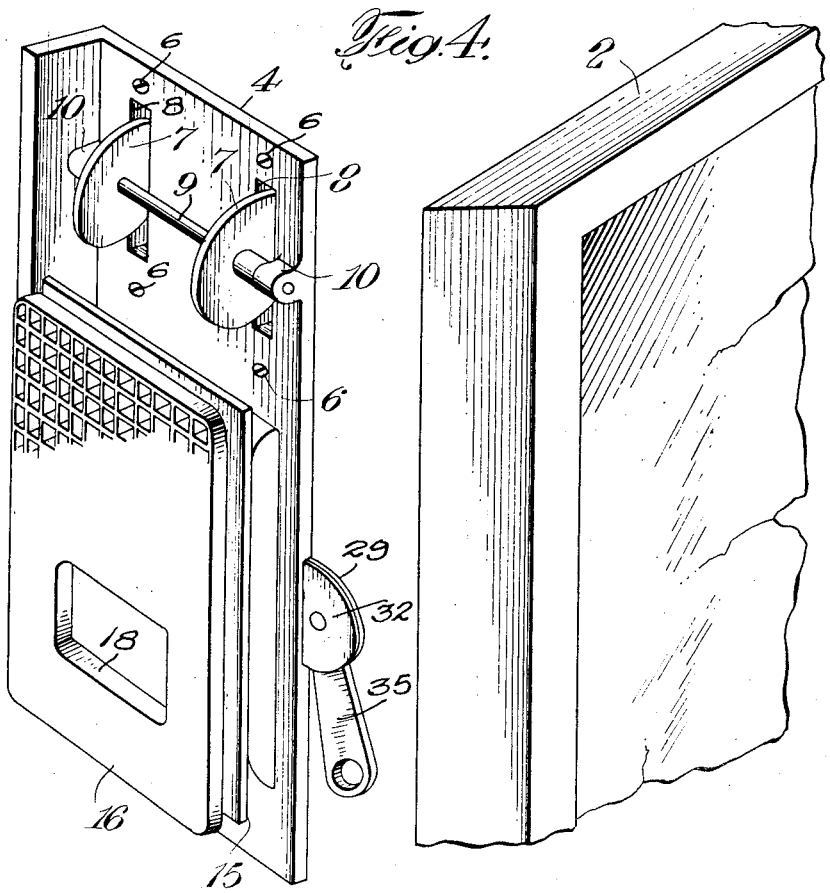
Fig. 4 is a perspective view of the aperture plate assembled with its associated parts, certain parts being omitted for clearness.
Figure 7:
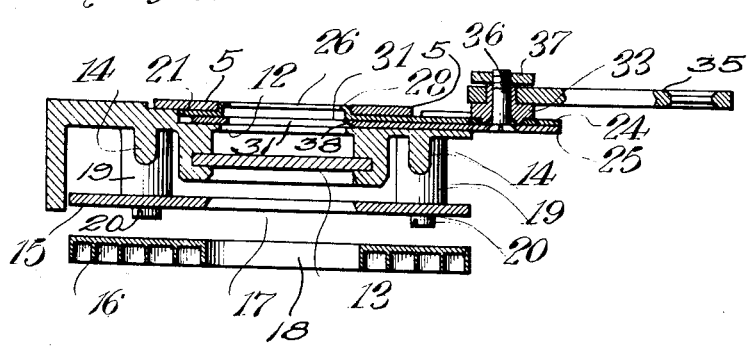
Fig. 7 is a horizontal sectional view of the mechanism shown in Fig. 6.

Referring to the drawings, there is shown in Figs. 3 to 7, an aperture plate illustrating the present invention applied to the parts of a moving picture projector. For simplicity, only the parts of the projector associated with the aperture plate have been shown in Fig. 4, including a door 2 partially open. A member 4 is mounted adjacent the door with runways or guides 5 on the inside thereof against which the edges of the film are pressed by suitable pressure pads not shown. The guides may be secured in position by screws 6. At the upper part of the plate, and extending through the guides are a pair of guide rollers 7 with their edges extending sufficiently far through the slots 8 in the member 4 to guide a film having a width substantially equal to the distance between the rollers. Preferably, the rollers 7 are mounted upon a spindle 9 in bearings 10 on the outside of the member 4. At the lower part of the member 4, between the guides 5, there is an aperture 12 (Fig. 7) adapted to permit the transmission of a beam of light through a film passing along the guides 5.

On the outside of the member 4 and adjacent this aperture 12 there may be formed suitable web members 14. A suitable shutter 13 is adapted to slide in guideways adjacent the sides of the aperture 12 and may be conveniently operated by a lever 11. Additional plates 15 and 16 are provided for dissipating heat with apertures 17 and 18 respectively registering with the aperture 12 in the main member. These plates may be mounted in any suitable manner such as by posts 19 and screws 20. The outer plate preferably is webbed on its outer surface to increase the dissipation of heat.

On the inside of the member 4 adjacent the aperture 12 is provided a recess 21 which extends under one of the guide members 5 and partially under the other guide member so that the recess completely surrounds the aperture 12. A removable aperture plate is provided comprising a pair of oblong pieces of sheet metal 24 and 25. The plate 24 adjoining the film has an aperture 26 of accurate dimensions. Preferably, the section of the plate adjacent this aperture is depressed from the plane of the plate at 28, as shown more particularly in Figs. 6 and 7. This depressed portion extends practically to be flush with the free surfaces of guides 5 and its length is equal to the distance between the two guideways 5. When inserted in the recess 21, the gap between the bottom of the recess and the guideways, 5, is sufficient to accommodate the depressed portion so that the plate may be readily inserted within the recess. When it reaches its extreme position in the recess the depressed portion 28 is pushed forward to fit between the guides 5 as shown more particularly in Fig. 7 and to thereby be substantially flush with guides 5 and support the middle of the film as it approaches and passes from the aperture. The film is thereby prevented from buckling. The free end of the aperture plate is preferably rounded as shown at 29 with a slot 30 formed in the end for purposes about to be described.

To hold the plate 24 rigidly in position, a second plate 25 is provided and adapted to slide in the recess 21 back of the aperture plate 24. When this second plate slides back of the first plate, the latter is kept from the bottom of the recess and held in its outer position with the depressed portion 28 nested between the guide members 5. These members hold it rigidly in position and it cannot be removed so long as the back plate is in the recess. On the other hand, it can be readily removed by removal of the back plate.

This holding plate 25 is preferably provided with an aperture 31 slightly larger than the aperture in the aperture plate and fixed to register therewith. At the free end 32 of this plate, there is provided a small aperture 34 adapted to receive a screw 36 or similar attaching member and the end of a washer 33. The aperture 34 registers with the slot 30 in the aperture plate. A suitable handle 35 preferably of bakelite or other material with heat insulation characteristics is attached by means of the screw 36 and washer 33 and nut 37 thru the aperture 34 to the holding plate and extends through the slot 30 in the aperture plate 24. This permits the holding plate to slide the length of the slot 30. The washer 33 is adapted to space the several parts and to permit free movement thereof.

Preferably, the aperture 31 in the holding plate is such that when in its extreme left position, as shown in Fig. 8, the aperture therein being slightly larger than the aperture in the aperture plate 24, the size of the beam of light is not affected. When moved to its extreme right position as shown in Fig. 9, the left end of the aperture in the aperture plate is covered by the holding plate, thereby shielding a portion of the aperture having a width equal to substantially the movietone or sound section of the film. With an aperture plate so constructed, it is merely necessary to pull the holding plate by means of the handle 35 into the desired position to change the size of the aperture to accord with the size of the picture being projected. The handle being made from bakelite is at a lower temperature than the adjoining metal parts and may be manipulated without difficulty. This permits an instantaneous change in the aperture to accommodate either standard or sound films. The side 38 of the aperture 31 may have a bevelled edge to avoid shadows and to increase the accuracy of the shield.

In Figs. 1 and 2 plates with different size apertures are shown. The plate in Fig. 1 has a symmetrically positioned aperture 39 for standard pictures and the plate in Fig. 2 has an aperture 40 for pictures with sound sections. The construction described herein lends itself to separate plates having apertures of the desired size as well as to the adjustable plate described above. The reason for this is the ease with which plates may be substituted. In order to change from one plate to another, that is, to change from the plate shown in Fig. 1 to the plate shown in Fig. 2, the screw 36 and washer 33 are removed and the holding plate pulled out of the recess 21 after which the aperture plate 24 may be readily removed and another substituted. Thereafter, the holding plate is inserted in place to hold the aperture plate in position. Such changes can be made in a minimum time because of the simplicity of the operation.

In Fig. 10, the aperture 41 in the aperture plate is at the center of the film and is symmetrical therewith. Figs. 11 and 12 illustrate plates with special types of apertures for showing specific types of pictures. The aperture 42 in the plates shown in Fig. 11 is elliptical whereas in Fig. 12 the aperture 44 is in the form of a house or other type of scenery. Plates such as these, may be readily substituted for the standard aperture plates by means of the present apparatus as described above.

In the operation of the device, the aperture plate proper is inserted within the recess 21 and the depressed portion 28 is permitted to fit between the guides 5; thereafter the holding plate is inserted back of the aperture plate to hold the latter in position. The two are joined together through the slot 30 and aperture 34 by means of a screw 36 and washer 33 attached to a handle 35. The size of the aperture may be adjusted by utilizing the handle 35 to change the position of the holding plate from its extreme right position to its extreme left, or if an entirely different type of aperture is desired, the holding plate and likewise the aperture plate can be readily removed and suitable aperture plates such as those shown in Figs. 2, 10, 11 or 12 may be substituted quickly.

It will be seen that the present invention provides a mechanism which permits pictures such as news reels without movietone or sound sections and pictures with sound sections to be projected consecutively in the same projector without necessitating interruption during the change of plates. Further, different aperture plates may be substituted in minimum time and the resulting construction held rigidly in position without likelihood of disarrangement. The parts are simple in construction and are of such shape that it is impossible to insert them in the wrong order. The invention may be applied to existing machines with slight changes therein. Further, the construction is fully capable of withstanding the rough usage to which it may be subjected.

While the invention is described in connection with moving picture projectors, it may, of course, be used in other mechanisms such as cameras and the like.

As various changes may be made in the form, construction and arrangement of parts without departing from the spirit of the invention and without sacrificing its advantages, it will be understood that all matter herein will be interpreted as illustrative and not in a limiting sense.

Having thus described my invention, I claim:

1. In a projecting machine or the like, the combination of a member having an aperture therein, a pair of film guides mounted on said member, an aperture plate adapted to fit in a recess between said guides and into said member, said plate having a depressed portion adapted to engage said guides, and a second plate adapted to be mounted back of said first plate to hold the first plate in engagement with the guides and to prevent its removal.

2. In a projecting machine or the like, the combination of a member having a recess therein, a pair of guides extending along said recess, an aperture plate adapted to fit into said recess between said member and said guides, the portion of said aperture plate adjacent the aperture therein being pressed out of the plane of the plate to fit between said guides, and means back of said plate for holding it in position, whereby said plate may be removed by removing said means.

3. In a projecting machine or the like, the combination of a member having a recess therein, guides extending along said member and over said recess, an aperture plate mounted in said recess between said guides and said member, said aperture plate having a depression thereon adapted to engage said guides, and a second plate adapted to hold said aperture plate so that said depression will be in effective position to prevent change in position of said aperture plate.

4. In a moving picture projector or the like, the comibnation of a supporting member having an aperture therein, a pair of film guides on said member, an aperture plate having a portion depressed to fit between said guides, a second plate mounted adjacent said aperture plate and adjacent said member to hold said aperture plate in position, the removal of the second plate making sufficient space behind the aperture plate to allow the removal thereof.

5. In a projecting machine having an aperture of predetermined size, film guides on opposite sides of said aperture to engage the lateral edges of the film and an apertured plate removably disposable adjacent said aperture, said plate having an offset portion adapted to lie with its surface in substantially the same plane as the surface of said film guides, said plate with said film guides formed to provide a contact surface for the four sides of each film section as said section is presented in said aperture and pressed against said guides.

6. In a motion picture projection machine for projecting standard size film and sound film, a channeled aperture support, an aperture plate mounted in the channel of said support and being provided with a picture projection aperture therein to allow projection of a standard size film, a second plate movably mounted in said channel and adjacent said first aperture plate and being provided with an aperture located to register in full size with the aperture in said first plate during the projection of standard size film, and means on said second plate for moving it relatively to said first plate to a position to cover a portion of the aperture adjacent one edge of the aperture in said first plate in front of which the sound strip of a sound film must pass, said second plate thereby preventing projection of a sound strip when the picture portions of a sound film are being projected.

7. In a motion picture projection machine, a gate plate having an aperture therein adapted to project a full width silent picture, said gate plate being provided with an outwardly extending transverse groove at one side of said aperture opening, said groove being of a height of at least that of the aperture opening therein, a film guide member associated with said gate plate for guiding the film in its passage in front of said aperture, said guide member overlapping a portion of said groove, a plate adapted to be mounted in said groove and behind said guide member and to be moved therein to a position to have an edge thereof overlap the adjacent side of said aperture for a distance equal to the width of a sound track on a sound film to prevent the projection of the sound track when the sound film is being passed through said gate plate of the projection machine, said plate adapted to be moved backward to a position where its edge does not overlap the edge of the aperture, a handle mounted on said plate for moving said plate instantly to cover or to uncover the portion of the aperture in front of which a sound track passes without stopping the machine or causing a shadow to be projected onto a projection screen, and means associated with the handle for limiting the movement between covering and uncovering position.

AUGUSTO DINA.